United States Patent [19]

Schriever

[11] 4,274,617
[45] Jun. 23, 1981

[54] ACTUATOR FOR CORE OR STRIPPER OF A MULTIPART MOLD

[75] Inventor: Karl-Hermann Schriever, Pretoria, South Africa

[73] Assignee: Hasco-Normalien Hasenclever & Co., Lüdenscheid, Fed. Rep. of Germany

[21] Appl. No.: 146,330

[22] Filed: May 2, 1980

[30] Foreign Application Priority Data

May 3, 1979 [DE] Fed. Rep. of Germany ....... 2917799

[51] Int. Cl.³ ............................................. B29D 1/022
[52] U.S. Cl. ....................................... 249/63; 249/68;
425/406; 425/411; 425/412; 425/414; 425/422;
425/423; 425/457; 425/589; 425/444;
425/450.1; 425/451.3
[58] Field of Search .................... 249/63, 64, 66 R, 67,
249/68; 425/406, 408, 409, 411, 412, 414, 423,
422, 436, 438, 443, 444, 450.1, 450.3, 451.4,
451.9, 457, DIG. 5, 589

[56] References Cited

U.S. PATENT DOCUMENTS

| 1,335,525 | 3/1920 | Patterson | 249/63 X |
|---|---|---|---|
| 1,958,199 | 5/1934 | Morin | 249/68 X |
| 2,253,651 | 8/1941 | Ring | 249/66 X |
| 2,718,032 | 9/1955 | Harvey | 249/63 |
| 2,783,502 | 3/1957 | Abplanalp | 249/63 |
| 2,834,988 | 5/1958 | Morris | 249/68 X |
| 3,074,113 | 1/1963 | Specht | 249/63 X |
| 3,134,142 | 5/1964 | Conner | 249/68 |
| 3,387,323 | 6/1968 | Wyllie et al. | 249/63 |

Primary Examiner—J. Howard Flint, Jr.
Attorney, Agent, or Firm—Montague & Ross

[57] ABSTRACT

A mold has at least two primary mold parts movable in a primary direction away from each other from a closed position defining a mold cavity to an open position, and at least one secondary mold part which may be a core pin or a stripper which is movable in the secondary direction transverse to the primary direction relative to at least one of the primary mold parts. An actuator has a primary rack extending parallel to the primary direction and a secondary rack extending parallel to the secondary direction and secured to the secondary mold part. These racks have respective primary and secondary rows of teeth having substantially parallel tooth flanks inclined to the respective directions, the primary row meshing with the secondary row. One of the racks is secured to one of the primary mold parts for joint displacement therewith in the primary direction relative to the other of the racks so that the secondary rack will automatically be moved in the secondary direction as the primary rack is moved in the primary direction.

10 Claims, 11 Drawing Figures

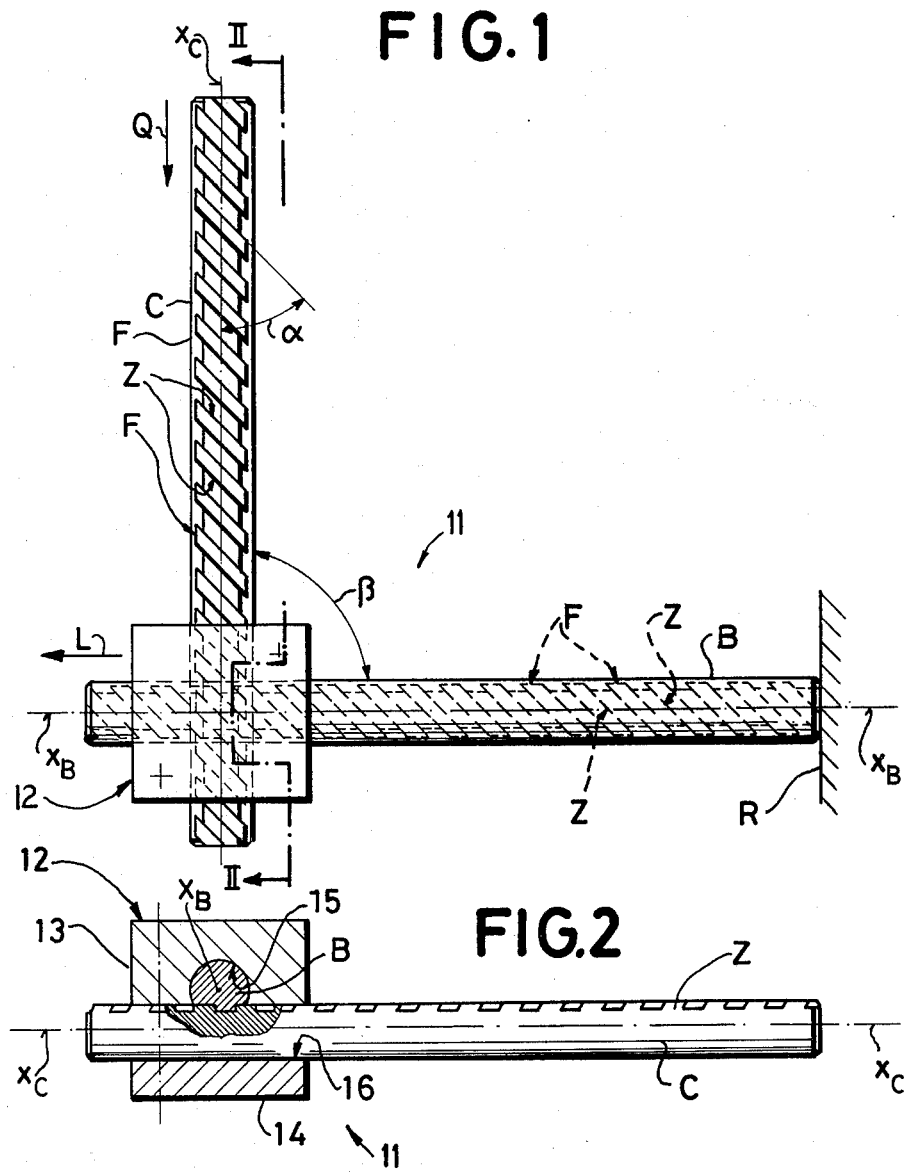

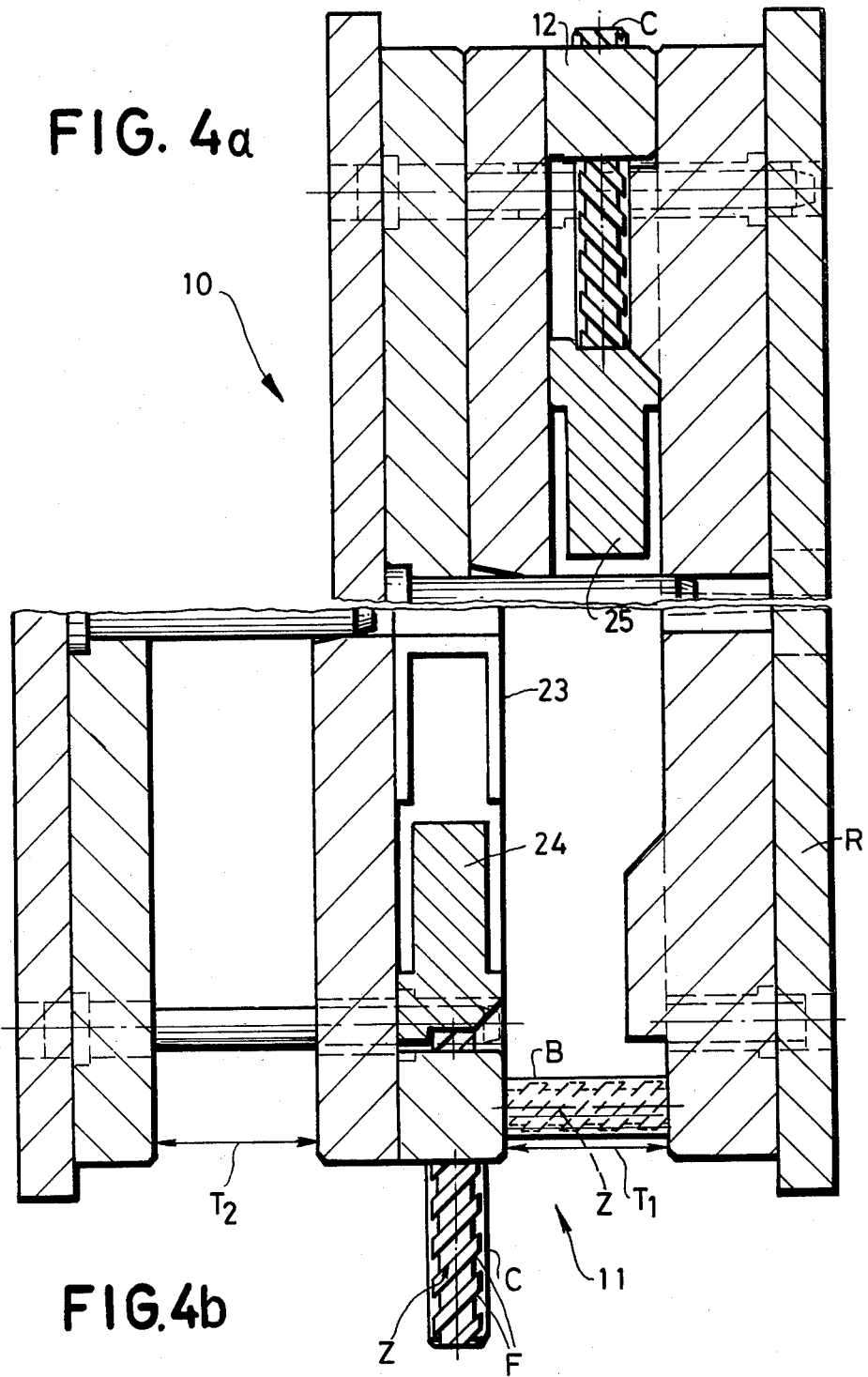

ACTUATOR FOR CORE OR STRIPPER OF A MULTIPART MOLD

FIELD OF THE INVENTION

The present invention relates to an actuator for displacing a core or stripper of a multipart mold. More particularly this invention concerns such an actuator usable for automatically displacing the mold core or stripper transversely to the opening direction of the mold.

BACKGROUND OF THE INVENTION

For many mold operations it is necessary to displace a mold core or stripper transversely to the closing direction of the mold. Thus in a core-type mold the core must be displaced normally in a direction perpendicular to the closing direction from an inner position extending into the mold cavity to an outer position when the mold is opened. Conversely with a stripper-type mold it is necessary to displace the stripper in a direction perpendicular to the opening direction to push the molded workpiece from the mold once it is opened, so that the stripper moves in as the mold opens.

Although it is known to simply provide a separate actuator, such as a separate hydraulic cylinder, to operate these secondary mold parts, the more common system entails providing on the secondary mold part an extension which projects at an angle both to the direction the secondary mold part must move in and to the direction that the primary mold parts move along. This extension is formed with an eye through which passes an inclined rod that is attached to one of the primary mold parts and that itself also extends at an angle to the motion direction of both the primary and secondary parts. When the primary mold parts move apart, therefore, the secondary mold part is displaced appropriately as the inclined rod of the primary part pulls back in the eye of the secondary part.

Such an arrangement does not normally provide for perfectly synchronous displacement of the secondary mold part relative to the primary mold parts unless the various inclined rods and the like are built very robustly. The opening force and, therefore, the force that the inclined closing bolt is loaded with increases with the sine of the angle defined by the inclined bolt. It has been found impracticable to increase this angle beyond 25°, to avoid excessive bending of the actuating bolt. This type of actuating system therefore presents several important design problems which mitigate against its use in many systems. Consequently recourse is frequently had to a totally separate actuator for a secondary mold part in order to assure synchronous operation of it.

OBJECTS OF THE INVENTION

It is therefore an object of the present invention to provide an improved actuator for use in a mold having at least one secondary mold part displaceable transversely to the primary mold part.

Another object is to provide such a system which surely and positively displaces the secondary mold part or parts in synchronism with the primary mold parts.

Another object is to provide such a system which in no way complicates the controller for the mold, and which can be incorporated in a mold at minimum cost.

SUMMARY OF THE INVENTION

These objects are attained in an actuator having a primary rack extending parallel to the primary direction in which the mold-cavity parts are movable relative to each other. A secondary rack extends parallel to the secondary direction along which the secondary mold part is displaceable and is secured to this secondary mold part. One of these racks is fixed relative to one of the primary mold parts for joint displacement therewith relative to the other rack. These racks have respective primary and secondary rows of teeth having substantially parallel tooth flanks inclined to the primary and secondary directions. The primary row meshes with the secondary row of teeth. Such a system therefore transmits force positively and accurately from the primary mold part to the secondary mold part. According to this invention the parallel tooth flanks extend generally perpendicularly to the bisector of the directions, that is they are inclined equally to both of these directions so that the secondary mold part will move perfectly synchronously with the primary mold parts.

According to further features of this invention the actuator comprises a guide block formed with primary and secondary passages respectively receiving the primary and secondary guides and opening into each other at the intersection of the primary and secondary displacement directions. This block can carry a core rod along which is displaceable a stripper plate constituting the secondary mold part. The secondary mold part can, of course, also be a core which itself passes through a passage in the guide block so that as the core is withdrawn the guide block itself acts as a stripper for the workpieces that will be carried on the core.

According to yet further features of this invention the racks are of D-section, having longitudinally extending flats formed with the respective rows of teeth. The passages and the guide are correspondingly of D-section, and the guide may be made of two pieces bolted together.

It is possible according to further features of the instant invention to provide each of the primary mold parts with a respective such primary rack. The secondary rack has two rows of teeth each in mesh with the teeth of the respective primary rack. The teeth of one of the primary rows are oppositely inclined to the teeth of the other of the primary rows. In such an arrangement the secondary part will therefore not only move perfectly synchronously with the primary parts, but will remain perfectly equidistant between them as they separate. Such an arrangement is particularly good for formation of many types of molded articles, as it leaves the molded article on the core between the mold parts once they open. Stripping from the core is far easier than stripping from either of the cavity-forming primary mold parts.

BRIEF DESCRIPTION OF THE DRAWING

FIG. 1 is a top partly diagrammatic view of the actuator according to this invention;

FIG. 2 is a section taken along line II—II of FIG. 1;

FIGS. 4a and 4b, 5a and 5b, and 6a and 6b are views of further mold arrangements according to this invention respectively in the open and closed positions.

SPECIFIC DESCRIPTION

Figures 3A, 3B:
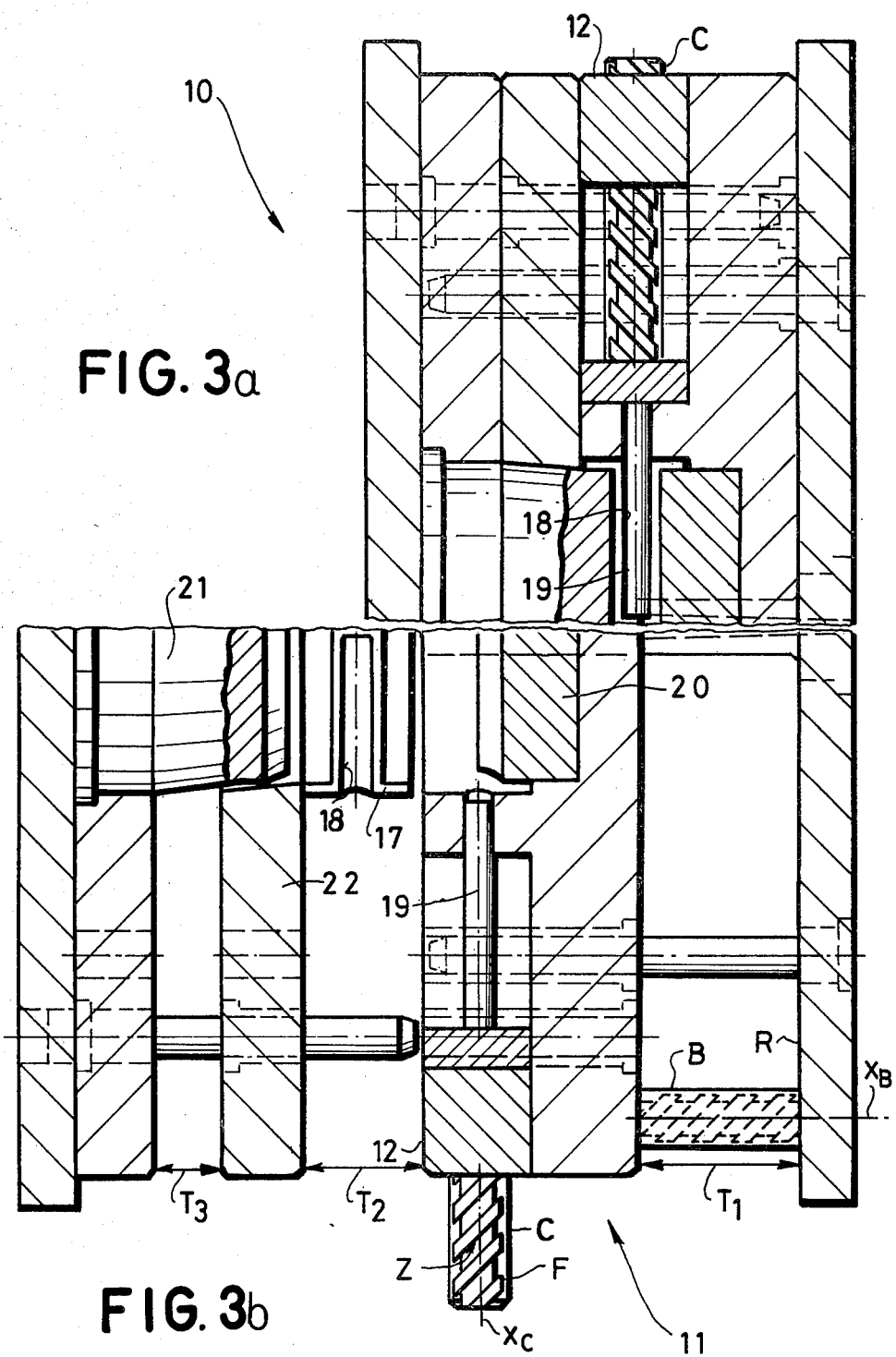
FIG. 3a is a large-scale sectional view of a mold and actuator according to the instant invention with the mold in the closed position.
FIG. 3b is a large-scale sectional view of a mold and actuator according to the instant invention with the mold in the open position.

As shown schematically in FIGS. 1 and 2 an actuator 11 according to the instant invention basically comprises a primary rack B centered on an axis $x_B$ and a secondary rack C centered on an axis $x_C$ that defines an angle $\beta$ of 90° with the axis $x_b$. The rack B is secured to a fixed abutment R and the rack C is normally secured to a movable secondary mold part as will be described below.

Both of the racks B and C are formed with teeth Z having flanks F inclined at angles $\alpha$ of 45° to the respective axes. The two racks B and C pass through a guide 12 formed by an upper guide plate 13 and a lower guide plate 14 secured together by bolts and forming orthogonal passages 15 and 16 for the racks B and C. FIG. 2 shows how these racks B and C are of D-section and formed on their flat sides with the teeth Z. These teeth Z mesh with each other as is apparent by comparison of FIGS. 1 and 2. Displacement of the secondary rack C relative to the primary rack B in a direction L parallel to the axis $x_B$ will displace the rack C in a direction Q perpendicular to the direction L. The motions of the racks B and C will be perfectly synchronous, since the flanks F of the teeth are perpendicular to a bisector of the angle $\beta$.

FIGS. 3a and 3b show how the actuator 11 can be incorporated in a mold 10 designed to make a workpiece or molded article 17 having a pair of opposite laterally opening holes 18. To this end the mold has a pair of primary mold parts 20 and 21 displaceable in the direction $x_B$ and a pair of secondary mold parts constituted as core pins 19 displaceable in the secondary direction $x_C$. In addition the mold has a stripper plate 22 positioned between the primary parts 20 and 21.

According to this invention the mold parts 20 and 21 are displaceable relative to the fixed support R to which is fixed the rack B, and the rack C is carried on the primary mold part 20 so as to be movable in the direction $x_B$. When the mold is opened first the primary part 20 separates from the support R by distance $T_1$ with simultaneous radial or outward retraction of the two core pins 19. Further opening of the mold creates a space $T_2$ between the stripper plate 22 and the primary mold part 20 to completely demold the workpiece 17, and further separation forms a gap $T_3$ between the primary mold part 21 and the stripper plate 22, thereby stripping the article 17 from this male mold part 21.

In FIGS. 4a and 4b a different arrangement is shown for making a workpiece 23 formed as a hollow cylinder having a central partition or web. The mold is substantially identical to that of FIG. 3, with the secondary mold parts 24 and 25 being slightly different, and having no stripper plates. The operation is identical here, with the two secondary mold parts 24 and 25 withdrawing outwardly synchronously as the mold is opened.

Figure 5A:
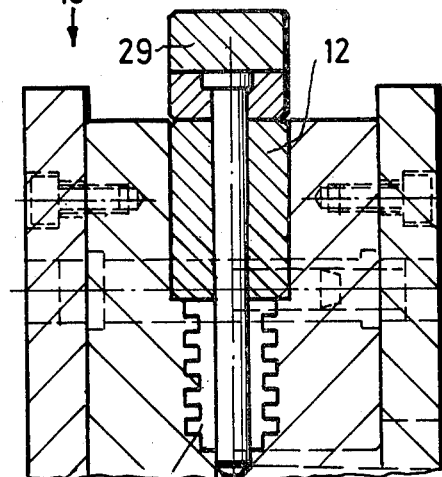
Figure 5C:
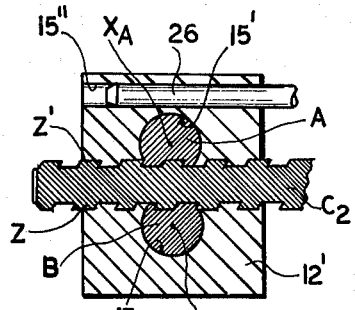
FIG. 5c is a section taken along Vc—Vc of FIG. 5b.
Figure 5B:
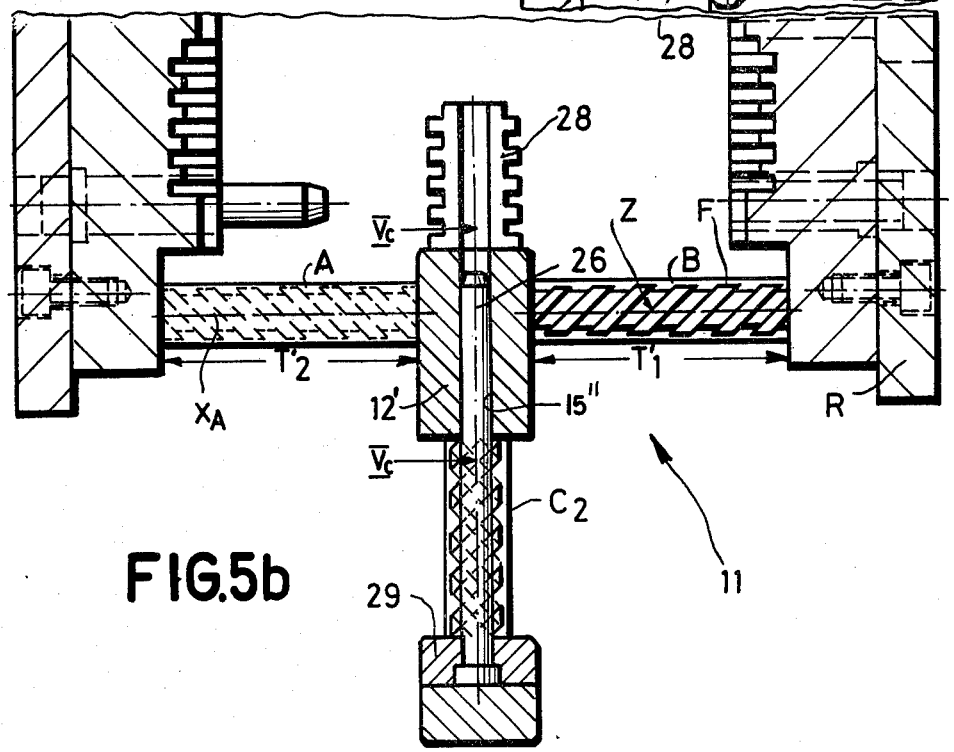

In FIGS. 5a and 5b an arrangement is shown for making hollowcore bobbins 28. A second primary rack A centered on an axis $x_A$ passes through a modified guide 12' which has a second bore or passage 15' for the rack A. In addition a secondary rack $C_2$ has a second set of teeth Z' which mesh with the teeth of the rack A. The teeth Z and Z' of the rack $C_2$ are oppositely inclined. In this manner as the primary mold parts are separated the guide 12' remains equidistant, by spacings $T'_1$ and $T'_2$, from these primary mold parts.

The rack $C_2$ has at its rear end a mounting block 29 to which is attached the rear end of core pin 26. Thus as the mold opens the core pin 26 will retract. Once the article 28 is completely demolded it will be carried backwardly by the core pin 26 until it abuts the guide 12' which will, therefore, act as a stripper. To this end the guide 12' is formed with yet another passage 15" through which the core pin 26 passes. The guide 12' therefore serves a double function, that of holding the racks A, B and $C_2$ relative to each other and that of a stripper.

Figures 6A, 6B:
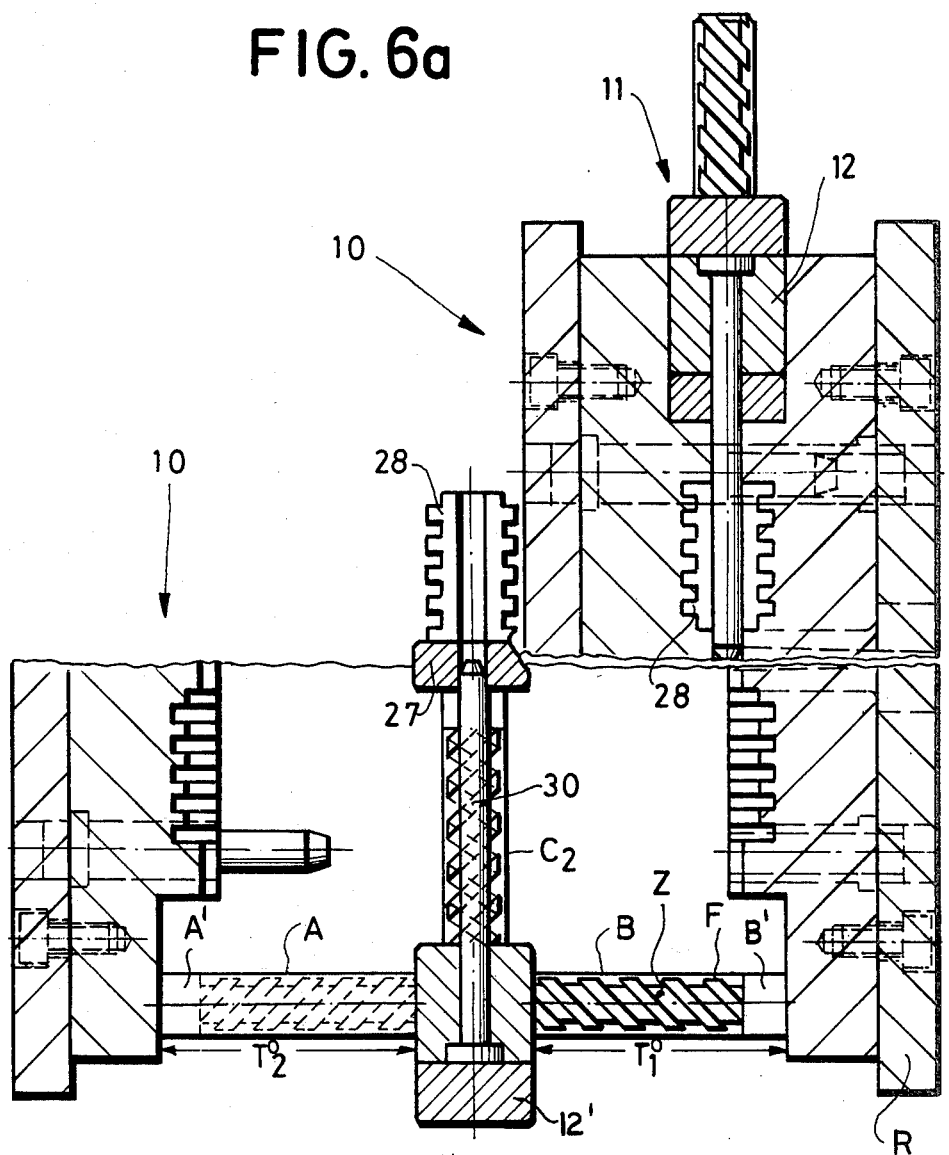

Substantially the same structure is shown in FIG. 6, but set up so as to operate oppositely. To this end the block 12' is provided with a fixed core pin 30 and the rack $C_2$ is provided at its front end with a stripper plate 27 that can move forwardly along the core pin 30. Thus as the mold opens the stripper plate 27 will move forwardly and the core pin 30 will strip the article 28 from it. In order to prevent the stripper plate 27 from moving forwardly until the mold 10 has opened, the racks A and B are provided with untoothed zones A' and B' for a limited amount of lost motion during opening.

Thus with the system of the instant invention an extremely efficient force transmission is effected between the primary mold parts and the secondary mold parts to move them synchronously with these primary mold parts. Enormous force transmission is possible with the relatively simple system according to this invention so that accurate opening and closing of the mold as well as withdrawal of the core pin on advance of the stripper plate is ensured.

I claim:

1. In combination with a mold having at least two primary mold parts movable in a primary direction away from each other from a closed position defining a mold cavity to an open position at least one secondary mold part movable in a secondary direction transverse to said primary direction relative to said primary mold parts, and drive mens for displacing said mold parts between said positions, an actuator comprising:

a primary rack extending parallel to said primary direction;

a secondary rack extending parallel to said secondary direction and secured to said secondary mold part, said racks having respective primary and secondary rows of teeth having substantially parallel tooth flanks inclined to said directions, said primary row meshing with said secondary row of teeth; and means securing one of said racks to one of said primary mold parts for joint displacement therewith in said primary direction relative to the other of said racks.

2. The combination defined in claim 1 wherein said secondary mold part is a core.

3. The combination defined in claim 1 wherein said secondary mold part is a stripper.

4. The combination defined in claim 1 wherein said actuator further comprises a guide formed with intersecting primary and secondary passages respectively receiving said primary and secondary racks and opening into each other at the intersection of said directions.

5. The combination defined in claim 4 wherein said racks are of D-section having longitudinally extending flats formed with the respective rows of teeth.

6. The combination defined in claim 1 wherein said directions are substantially perpendicular and said flanks form angles of about 45° with said directions.

7. The combination defined in claim 1 wherein each of said primary mold parts has a respective such primary rack, said secondary rack having two such secondary rows of teeth each in mesh with the primary row of the respective prime rack, the teeth of one of said secondary rows being oppositely inclined to the teeth of the other of said secondary rows.

8. The combination defined in claim 7 wherein said primary racks are fixed on the respective primary mold parts and flank said secondary rack.

9. The combination defined in claim 7 wherein said actuator further comprises a guide formed with intersecting primary and secondary passages respectively receiving said primary and secondary racks and opening into each other at the intersection of said directions, said guide further being formed with a core-pin passage, said secondary mold part being a core pin passing through said core-pin passage.

10. The combination defined in claim 1 wherein said parallel tooth flanks extend generally perpendicular to a bisector of said directions.

* * * * *